United States Patent
McAleenan

(10) Patent No.: US 11,606,002 B2
(45) Date of Patent: Mar. 14, 2023

(54) FLYWHEEL ENERGY STORAGE SYSTEM

(71) Applicant: KAZAK TECHNOLOGIES, INC., Woolwich, ME (US)

(72) Inventor: Michael McAleenan, Woolwich, ME (US)

(*) Notice: Subject to any disclaimer, the term of this patent is extended or adjusted under 35 U.S.C. 154(b) by 0 days.

(21) Appl. No.: 17/242,748

(22) Filed: Apr. 28, 2021

(65) Prior Publication Data

US 2021/0372377 A1  Dec. 2, 2021

Related U.S. Application Data

(63) Continuation-in-part of application No. 16/237,605, filed on Dec. 31, 2018, now abandoned.
(Continued)

(51) Int. Cl.
*H02K 7/02* (2006.01)
*F03G 3/08* (2006.01)
(Continued)

(52) U.S. Cl.
CPC .............. *H02K 7/025* (2013.01); *F03G 3/08* (2013.01); *F16F 15/305* (2013.01); *F16F 15/31* (2013.01); *F16C 2361/55* (2013.01)

(58) Field of Classification Search
CPC ........ F16F 15/30; F16F 15/305; F16F 15/315; F16F 15/3153; F03G 3/08; H02K 7/02;
(Continued)

(56) References Cited

U.S. PATENT DOCUMENTS 2,403,478 A * 7/1946 Burnat .................... F16F 15/31
                                                      74/573.11
2009/0320640 A1* 12/2009 Elliott ...................... F03G 3/08
                                                      74/572.21
(Continued)

FOREIGN PATENT DOCUMENTS

DE    2930501 A1 *  3/1981  .............. F16F 15/22
EP    0081968 A1 *  6/1983  ............ F16F 15/305
(Continued)

OTHER PUBLICATIONS

Machine translation of JP 56-134648 A obtained on Jan. 20, 2022.*

*Primary Examiner* — Adam D Rogers

(57) ABSTRACT

Flywheel system properties are enhanced with rim designs that control stress at operational rotational velocities. The tensile strength of fiber-resin composites can be aligned with radial forces to improve radial stress loading. Loops with composite casings can be arranged around the flywheel circumference with a majority of the fibers being aligned in the radial direction. The loops can enclose masses that contribute to energy storage in the flywheel system. Masses can be arranged around the hub circumference with a hoop wound composite casing enclosing the masses and hub. The masses subjected to radial forces are radially displaced with increasing rotational velocity and can provide compressive force to the fiber-resin composite to contribute to maintaining composite integrity. With the alignment of fibers in hoop or radial directions, higher loading permits increase rotational velocities, which can significantly add to the amount of energy stored or produced with the flywheel.

19 Claims, 5 Drawing Sheets

Related U.S. Application Data

(60) Provisional application No. 62/612,626, filed on Dec. 31, 2017.

(51) Int. Cl.
  *F16F 15/30* (2006.01)
  *F16F 15/305* (2006.01)
  *F16F 15/31* (2006.01)

(58) Field of Classification Search
  CPC ...... H02K 7/025; H02K 7/09; F16C 32/0459; F16C 32/0474; F16C 32/0491; F16C 2361/55
  See application file for complete search history.

(56) References Cited

U.S. PATENT DOCUMENTS

| | | | |
|---|---|---|---|
| 2019/0203802 A1* | 7/2019 | McAleenan | F16F 15/305 |
| 2019/0203803 A1* | 7/2019 | McAleenan | H02K 7/025 |

FOREIGN PATENT DOCUMENTS

| | | | | |
|---|---|---|---|---|
| EP | 3343065 A1 * | 7/2018 | | H02K 7/02 |
| JP | 55006038 A * | 1/1980 | | F16F 15/31 |
| JP | 56134648 A * | 10/1981 | | F16F 15/31 |
| JP | 60053245 A * | 3/1985 | | F16F 15/31 |

* cited by examiner

FLYWHEEL ENERGY STORAGE SYSTEM

CROSS-REFERENCE TO RELATED APPLICATIONS

This application is a continuation-in-part of U.S. patent application Ser. No. 16/237,605 filed Dec. 31, 2018, which is now abandoned, and which is a continuation of U.S. Provisional Patent Application Ser. No. 62/612,626, filed Dec. 31, 2017, the entire contents of both of which are hereby incorporated herein by reference.

STATEMENT REGARDING FEDERALLY SPONSORED RESEARCH OR DEVELOPMENT

This invention was made with government support under Contract No.: N68335-17C-0310 awarded by the United States Navy. The government has certain rights in the invention.

BACKGROUND

Conventional flywheel energy systems and flywheel energy storage devices use commercial rims composed of either carbon fiber/epoxy or carbon fiber & glass fiber/epoxy materials. However, these conventional commercial rims have a limiting rotational velocity due to the radial force acting on their comparatively weak matrix (epoxy) properties. As a result, conventional composite rims fail gracefully due to the radial force, resulting from angular velocity, acting on the thru thickness composite laminate delamination, and therefore rim failure.

SUMMARY

Flywheel system properties are enhanced with rim designs that control stress at operational rotational velocities. According to aspects of the present disclosure, the tensile strength of fiber-resin composites can be aligned with rim rotational radial forces to improve radial stress loading. Loops with composite casings can be arranged around the flywheel circumference with fibers being aligned in both the radial and hoop direction. According to an embodiment, the loops can enclose masses that contribute to energy storage in the flywheel system. The masses acted upon by rim radial forces during operation can provide compressive force to the loops to contribute to maintaining loop composite integrity by significantly reducing thru thickness laminate stress, thereby minimizing the potential for delamination. With the alignment of fibers in both the radial and hoop directions, higher loading, i.e. fiber tensile loading, permits increase angular velocities, which significantly increase the amount of energy stored by the flywheel.

An alternate rim configuration or second embodiment utilizes mass to apply a compressive load to the fiber-resin composite whose fibers are aligned in the hoop direction around the circumference of the flywheel rim. Hoop direction fibers (with respect to the longitudinal/rotational axis) enclose radial displacing masses and a hub. Radial displacing masses acted upon by rim radial forces apply a compressive load to the laminate to minimize the potential for laminate delamination, significantly increasing rotational velocity and therefore significantly increasing the amount of energy stored by the flywheel. Radial masses may remain in contact with the hub (elastic material) or radially displace (inelastic material) from the hub during rim rotation.

According to some embodiments of the present disclosure, a flywheel for a flywheel energy storage system or device includes a hub configured to rotate about a longitudinal/rotational axis, a fiber-resin composite material coupled to an outer side of the hub, where at least some or all of the fibers in the composite material are oriented in the hoop direction with respect to the longitudinal axis. The flywheel may include a loop composed of the fiber-resin composite material coupled to the hub. A mass may be housed within the loop such that the mass can apply compressive force to the loop when a radial force is applied to the mass. The flywheel may include a hub with 1 or multiple radially displacing masses located around the circumference or perimeter of the hub. The mass composition may include aluminum or steel, for example. A percentage of fibers aligned in the hoop direction may be in an inclusive range of from about 25% to about 100%. Four or more loops may be arranged symmetrically around the hub. Another configuration orients 2 loops on either end of the hub (dipole) or a multitude of radial displacing symmetric masses around the hub or 1 radial displacing elastic mass around the hub.

According to aspects of the present disclosure, the hub and a fiber-resin composite material may be configured to withstand a rotational velocity in an inclusive range from about 15,000 rpm to about 50,000 rpm, limited only by conventional or predetermined material strength limits. The rim diameter may be in an inclusive range from about 15.24 cm (6 in) to about 203 cm (80 in), limited only by the predetermined material strength limits. The flywheel may be configured to obtain a kinetic energy in an inclusive range from about 0.5 MJ to about 3000 MJ, dependent on material strength limits. The fiber-resin composite material may be releasably coupled to the outer side of the hub, such that the flywheel is modular in construction.

A method for constructing a flywheel for a flywheel energy storage system or device may include coupling a fiber-resin composite material to the outer surface or outer radial limits of a hub or to the surface or outer radial limits of some or all radial displacing masses configured to rotate about a longitudinal axis, and aligning at least some or all of the fibers in the composite material in a hoop direction with respect to the longitudinal/rotational axis. The method may include arranging the fiber-resin composite material in a loop or hoop direction. The method may include disposing a mass within the loop such that the mass can apply compressive force to the loop when a radial force is applied to the mass. Alternatively, the method may include radial displacing masses positioned around the circumference of the hub that apply a compressive force to the hoop laminate when a radial force is applied to each mass. The method may achieve high rotational velocity by using mass(es) located symmetrically around the hub contained by hoop wound fiber-resin composite that radially displace with increasing rotational velocity. The method may include disposing two (dipole) or more loops symmetrically around the hub or two or more masses around the hub. The method may include fastening the loop to the hub with one or more of a bolt, a nut, a threaded opening in the loop, or a rod and shear pin or shear web. The method may include a geometric interface joint between the hub and radially displacing mass(es) contained by a hoop wound fiber-resin composite material.

According to aspects of the present disclosure, in the flywheel system, the mass of the rim, acted upon by the centrifugal or radial force, can be utilized to alter rim cross sectional geometry at design speed. Elliptical cross sectional shaped rims utilize bending stresses to mitigate radial stress. In the present disclosure, rim mass is a design variable, that permits rim rotational velocity improvement or optimization by increasing or decreasing the rim's mass moment of inertia. This modification is not used in any previous conventional commercially designed composite flywheel rim. Conventional practice of adding nano fillers to the resins offer a limited increase in matrix tensile strength and/or matrix mass. The fiber tensile strength of 711 ksi is used for the tensile strength model.

During experimentation, decade's worth of test data were used to analyze and to validate the disclosed rim designs of the present disclosure. The test data was derived from conventional commercial rims with a carbon fiber/glass fiber/epoxy matrix and carbon fiber/epoxy running in the hoop direction or around the perimeter of the rim. The conventional rim used was approximately 7" thick and rated for a maximum rotational velocity of 15,000 rpm. This type of conventional composite rim has been state of the art for 30 years. At 15 k rpm the conventional rim uses approximately 10% of the tensile strength of the carbon fiber. This lower utilization has led to conventional rim failure due to delamination over time due to the radial force acting on the thru thickness mass of the carbon/glass/epoxy rim, e.g., acting in the radial direction. The test data showed evidence that delamination changes rim balance causing vibration, such that the detection of vibration causes the FES to shut down. Previous conventional flywheel implementations have been limited in composite rim rotational velocity due to this factor. The conventional rim's reaction to the radial force is due to the comparatively weak epoxy matrix tensile strength. Rim radial stress failures has controlled lightweight composite flywheel rim design for decades.

The rim designs of the present disclosure discussed herein control the application of radial stress, in part by separating conventional historical rim designs that do not utilize mass to the present disclosure rim's use of radially displacing mass components to apply a compressive load on the inner radial surface of the enclosing composite laminate. The interaction between rim, separate mass, and the radial force acting on that separate mass and radially displacing that mass to apply a laminate compressive load permits the present disclosure design modifications and improvements. In some examples of the present disclosure, the separate mass reacts to the radial force at a designed rotational velocity, such that the separate mass radially displaces due to the radial force acting on the mass. The separate radial displacing mass(es) may or may not remain in contact with the hub during rotation. Restricting mass radial displacement with increasing rotational velocity is hoop wound carbon fiber/epoxy laminate. The radial displacing mass(es) bear up against the restricting carbon fiber/epoxy laminate and therefore apply a compressive load on the laminate. This compressive load increases with increasing rotational velocity. This increasing compressive load acts on the laminate to counter act laminate delamination. The separate mass compressive force minimizes the through laminate thickness radial tensile force, which overcomes the challenges that causes conventional state of the art commercial composite rims to delaminate. The separate mass compressive force is dependent on material density, material strength, radial position and rotational velocity, which permits composite laminate radial stress to be controlled by design.

Flywheel ancillary equipment parasitic losses are reduced to improve Flywheel Energy System (FES) efficiency, according to aspects of the present disclosure. The design of the rotating flywheel can contribute to ancillary equipment design and efficiency. One approach to improve FES efficiency is to significantly reduce the weight of the flywheel rim. Another approach is to increase rotational velocity of the rim. Some benefits of these approaches, individually or in combination are discussed below.

Based upon experimentation, a lightweight rim can reduce the energy used by homopolar magnetic bearing structure, which can contribute to lowering magnetic bearing parasitic losses. A lighter rim can contribute to reducing parasitic energy losses in motor/generator configurations. Significantly increasing rim rotational velocity can have a direct effect on reducing motor/generator specifications or energy usage and reduces vacuum gap pumps percentage energy use. Such reductions can lead to lower motor/generator parasitic losses. Significantly increasing rotational velocity and reducing parasitic energy losses has the added benefit that each FES unit stores more energy. With such a benefit, fewer FES units can be used for a given storage capacity, leading to reduced purchase and installation costs. In addition, a reduction in the number of units can have a beneficial effect on space usage, which can be of significant value in situations where space is constrained. Commercial conventional megawatt flywheel systems may have a maximum rotational velocity of about 15,000 rpm. If a flywheel were to operate at twice the rotational velocity, e.g., 30,000 rpm, that would mean that four times the energy storage may be obtained.

According to aspects of the present disclosure, at least one design challenge to overcome is increasing rotational velocity to reduce ancillary equipment losses is to reduce composite laminate thru thickness radial stress. One factor that can practically constrain rotational velocity of flywheel systems is radial stress. In accordance with the present disclosure a flywheel design is provided that manages radial stress by design among other operating factors. A composite carbon fiber/epoxy innovative rim design is provided that permits rotational velocities greater than state of the art flywheel rims of 15,000 rpm, for example several rim designs utilizing this technology may be capable of exceeding 30,000 rpm, limited only by current material properties.

Finite element software analyses on conventional commercial carbon/epoxy rim models were used to validate some designs of the present disclosure against extensive conventional commercial rim material test data. What was observed was that as rotational velocity increases so does the radial force acting on the laminate radial thickness, such that the radial force causes the laminate to delaminate. Delamination of the laminate causes flywheel rim failure. The disclosed design of the present disclosure utilizes the radial force acting on the radial displacing mass(es) to apply a compressive force to the laminate to counteract the radial force acting on the laminate which minimizes the potential for delamination. It is this interaction that permits the rim of the disclosed design of the present disclosure to utilize the full tensile strength of high strength carbon fiber and achieve flywheel rim high rotational velocities that maximize flywheel rim energy storage.

The novel rim design of the present disclosure is readily scalable. These disclosed designs can be for rim diameters less than 60", larger rim diameters are also proposed. Taking advantage of carbon fiber tensile properties, the novel rim design permits these size rims to spin at higher rotational velocities than conventional state of the art flywheel rims.

The increased rim rotational velocity of the present disclosure reduces FES ancillary equipment energy losses and hardware costs. The rim cross sectional design of the present disclosure takes advantage of low cost extrusion and pultrusion fabrication processes.

According to aspects of the present disclosure, reducing/controlling composite rim radial stress is important to increase the energy-to-mass ratio, energy to volume ratio and permit increased rotational velocity. Increased rotational velocity significantly increases kinetic energy, because kinetic energy increases as the square of the rotation speed (ω) versus a linear increase with mass. As rotational velocity increases so does the centrifugal force: Centrifugal (Radial) Force: $F_r=m*\omega^2*r$ The amount of energy storage per FES unit can be increased by increasing angular velocity (ω) for a constant radius (r). The two components of flywheel design that principally determine the total energy stored ($E_k$) for a given mass are radius (r) and rotational speed (ω). $E_k$ can be expressed by: $E_k=0.5\ m_c r^2 \omega^2$, where $m_c$ is total mass.

Rewriting the total energy stored equation yields the kinetic energy equation (KE): $0.5*I_m$ (spin axis)$*\omega^2$(in-lbf), where $I_m$=mass moment of inertia of the rim about its spin axis: $I_m=I+mr^2$.

A benefit of the new rim designs discussed herein is the ability to utilize rim mass as a design variable. Using rim mass as a design variable is not used in conventional state of the art commercial flywheel rim designs. According to aspects of the present disclosure, if rim mass is doubled and rim geometry/rotational velocity are held constant, then $I_m$ is doubled. Doubling $I_m$ has the benefit of doubling the rim's KE. For example, if motor/generator rotational velocity is limited, loop rim geometry can expand the radius and increase filler mass. The new rim designs of the present disclosure permit increased loading on the rim material for a given motor/generator speed, which can increase stored energy.

BRIEF DESCRIPTION OF THE SEVERAL VIEWS OF THE DRAWINGS

The disclosure is described in greater detail below, with reference to the accompanying drawings, in which.

DETAILED DESCRIPTION

The flywheel rim designs of the present disclosure are presented and discussed herein. Some of the flywheel rim designs include a member (or members) connected to a hub that includes a laminate casing. The laminate casing is configured with a predetermined loading capacity and arranged with an enclosed space. Housed in the enclosed space is a mass (or masses) with a density greater than a density of the laminate casing. Wherein upon rotation, an operational radial force applies a thru thickness laminate radial load to the laminate casing, while simultaneously radially displacing the mass to apply an amount of compressive load on an inner radius of the laminate casing. The applied amount of compressive load increases the laminate casing predetermined loading capacity by the amount of compressive load counteracting the thru thickness laminate radial load. Resulting in a corresponding increase of angular velocity, that therefore increases an amount of energy stored by a flywheel energy storage system. Accordingly, the flywheel rims of the present disclosure may be operated in an inclusive range from about 15,000 rpm to about 50,000 rpm. The flywheel rim diameter may be in an inclusive range from about 15.24 cm (6 in) to about 203 cm (80 in), limited only by current material properties. The flywheel rim configurations of the present disclosure may be able to obtain a kinetic energy of an inclusive range from about 0.5 MJ to about 3000 MJ.

Figure 1:
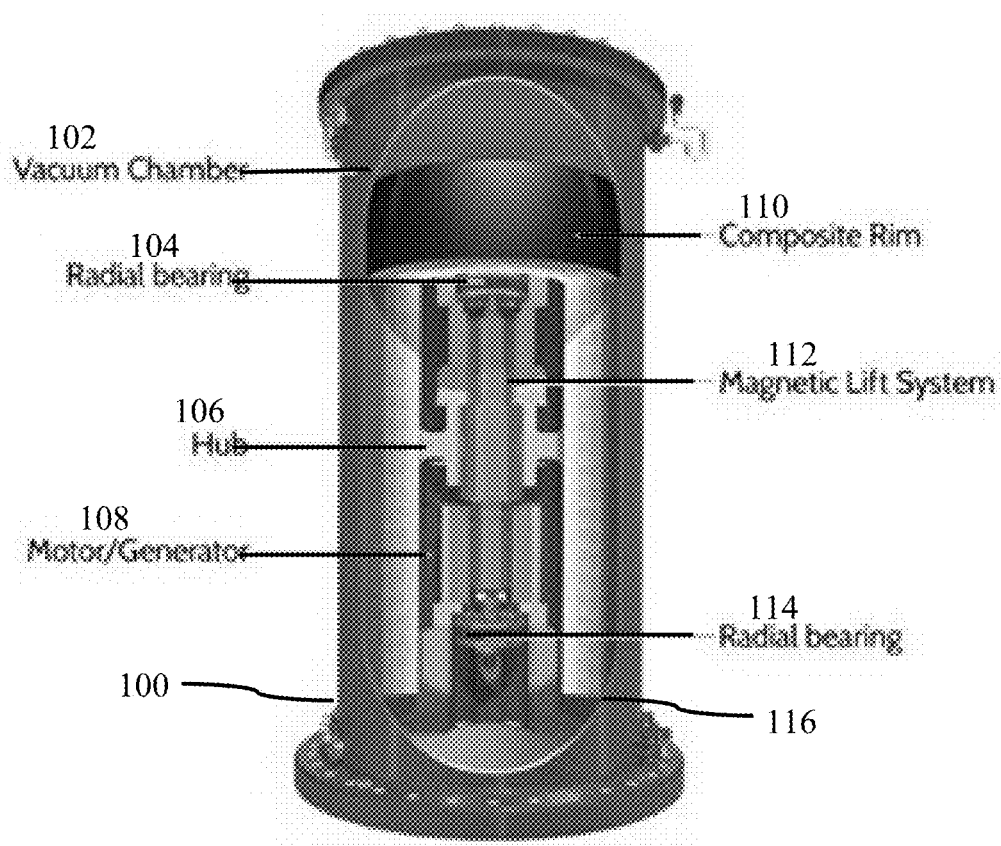
FIG. 1 (PRIOR ART) is a partially cut away top view of a conventional flywheel system.

FIG. 1 (prior art) is a partially cut away side view of a conventional flywheel energy system 100. The conventional flywheel energy system 100 includes a casing 116 that houses the flywheel within a vacuum chamber 102. The conventional flywheel has a carbon and glass fiber/epoxy composite rim 110 that is supported by radial bearings 104, 114. A hub 106 is supported with a magnetic lift system 112, which contributes to reducing parasitic losses in system 100 during operation. The conventional flywheel energy system 100 includes motor/generator 108 for driving the conventional flywheel and generating electrical power from the conventional flywheel during operation.

Conventional commercial fabrication techniques for a conventional rim 110 utilize a unidirectional filament winding manufacturing process, which creates a laminate with carbon fibers or carbon fibers/glass fibers oriented in the hoop or circumferential direction. The tensile strength of the carbon fibers is about 4900 MPa (711 ksi). The fiber orientation in the circumferential direction means that the carbon and/or glass fiber/epoxy laminate reacts to the radial force through thickness as an out-of-plane load or stated another way, a normal/transverse load to the laminate. During operation of the conventional rim, the radial force is observed as a load through the laminate thickness. The epoxy resin and transverse strength of the unidirectional carbon fiber filaments reacts to the radial force during operation. Epoxy neat resin tensile strength is approximately half of the fiber tensile strength, or about 2758 MPa (400 ksi). In commercial practice neat resin tensile strength properties are typically greater than inter-lamina resin tensile strengths. Since inter-lamina tensile properties can vary depending upon the resin, volume fraction, fabric type/material, fiber sizing and manufacturing (curing/post curing) method, the actual properties of the composite are empirically determined with coupon testing. The failure mode of conventional rims constructed with this technique are often rim delamination due to through thickness radial stress. The radial loading on such conventional rim designs is reacted via the lower strength laminate direction i.e.: epoxy or polymer matrix. The practical consequence of the failure mode and construction technique is a significant reduction and upper limit in rotational velocity. Although such conventional composite construction techniques can be modified to bolster inter-laminar strength, the conventional design is still limited with regard to flywheel rotational velocities. In addition, these conventional rim designs obtain a high radial growth during operation, which creates a mismatch between the composite conventional rim and metallic hub on which the conventional rim is mounted.

Figure 2:
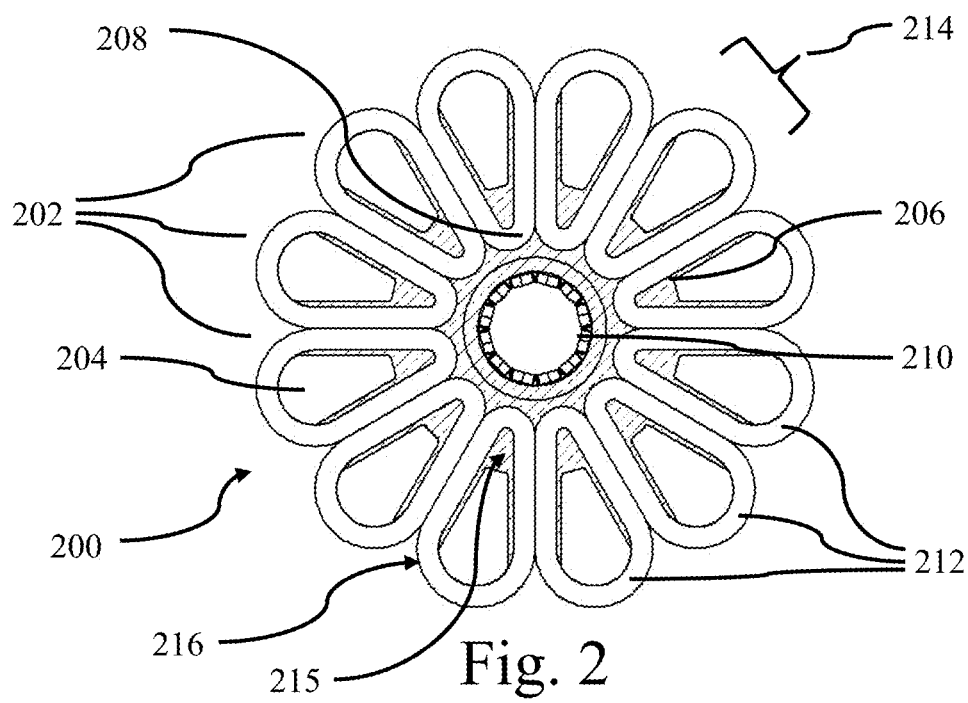
FIG. 2 is a cross-sectional side view of an example flywheel design, according to some embodiments of the present disclosure.
Figure 3:
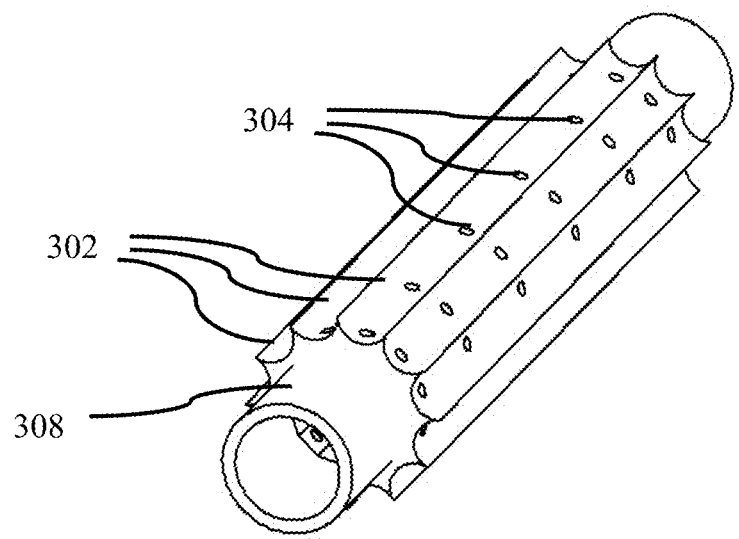
FIG. 3 is an isometric view of a flywheel hub from the example of FIG. 2.
Figure 4:
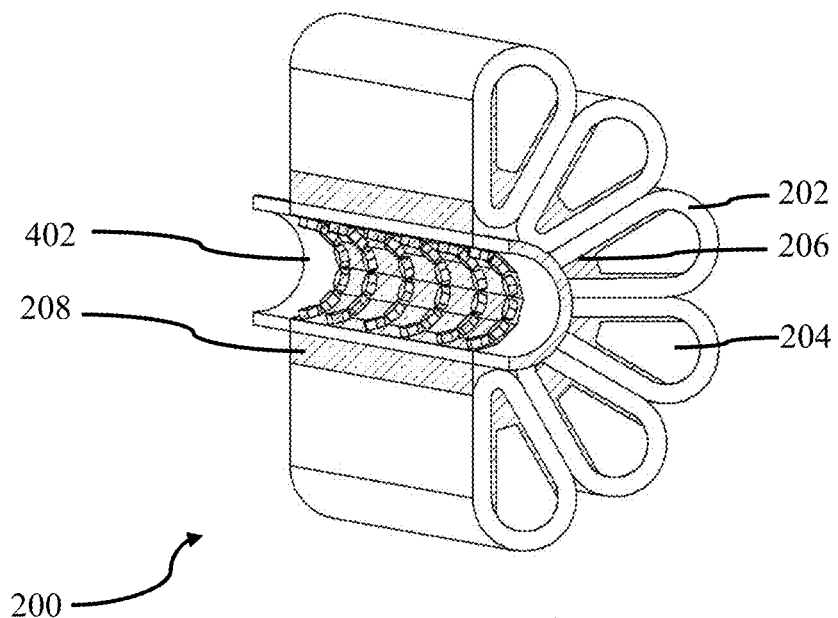
FIG. 4 is a cut away isometric view of a portion of an example flywheel design showing attachment features, according to some embodiments of the present disclosure.

Referring to FIGS. 2, 3 and 4, an example of a flywheel 200 of the present disclosure is illustrated. FIG. 2 is a cross-sectional side view of a flywheel 200 according to an example design of the present disclosure. FIG. 3 is an isometric view of a flywheel sprocket or hub 208. FIG. 4 is a cut away isometric side view of a portion of flywheel 200 showing attachment features.

Referring to FIG. 2, flywheel 200 includes twelve lobes 202 that have a wedge-shaped cross section. Each of lobes 202 extend the length of flywheel 200, and include an outer casing 212 that is composed of composite materials such as carbon fibers and/or glass fibers in a resin matrix, such as epoxy.

The fibers are, for example, wound around a hoop direction for each lobe 202 to form casing 212. For example, the fibers are aligned in a circumferential direction with respect to an individual lobe 202 in layers to form a composite laminate. The orientation of fibers can vary between the different lobes 202, e.g., between about 0 and 45 degrees with respect to a normal to a longitudinal axis of lobe 202. Each lobe 202 includes a filler material 204, which radially displaces with increasing angular velocity.

Still referring to FIG. 2, filler material 204 may be implemented as a variable density filler. For example, filler material 204 may have a density gradient that increases with radial distance from a center of flywheel 200. Material 204 may have different density material stacked inside each lobe 202. Each lobe 202 may house and retain material 204 against radial loading during operation.

Referring to FIG. 2 and FIG. 3, a retaining structure 206 is located internally to each lobe 202. Structure 206 may be metallic, and may be constructed to be a bolt flange that can accept, house or fix fasteners for attaching lobe 202 to hub 208. Lobes 202 can be assembled to or disassembled from hub 208 using a fastener arrangement in conjunction with structure 206. The example fly wheel 200 shown in FIG. 2 has bolts 210 that are located in and pass through openings 304, as shown in FIG. 3, in hub 208 and thread into structure 206 to fasten and secure lobes 202 to hub 208. In such an example, structure 206 provides a threaded opening to receive bolts 210. Other example attachment arrangements include bolts 402 (FIG. 4) that pass through openings 304 of FIG. 3 and are threaded into nuts (not shown) that are retained in structure 206. The bolts/nuts may, in some examples, be retained inside hub 208 or in structure 206, for example by welds or recesses size and shaped to receive the bolt heads/nuts. Structure 206 may be configured to receive shear pins or shear webs (not shown) that fasten lobes 202 to rods (not shown) that extend through openings 304 of FIG. 3 from hub 208 into structure 206.

FIG. 3 shows hub 208 that rotates about a longitudinal/rotational axis 301, with curved recesses 302 that are shaped and sized to be complementary with a smaller dimension end of wedge-shaped lobes 202 of FIG. 2. Lobes 202 of FIG. 2 are snugly received in recesses 302 to permit lobes 202 of FIG. 2 to be tightly secured to hub 208.

In practice, hub 208 is mounted to an axle or rotor supported by radial bearings, such as is illustrated in flywheel system 100 in FIG. 1. Hub 208 may be suspended by a magnetic lift system 112 in FIG. 1.

Referring to FIG. 2, FIG. 3 and FIG. 4, the flywheel designs discussed herein seek to improve energy storage either by increasing rim angular velocity or if angular velocity is restricted by increasing mass and rim diameter, improve reliability and usability and obtain advantages that are unavailable with prior designs. The design example illustrated in FIGS. 2, 3 and 4 can achieve a number of advantages over prior flywheel designs and systems, as discussed below.

The kinetic energy (KE) of a flywheel is given by the following equation (1):

$$KE=0.5*I_m(\text{spin axis})*\omega^2(\text{in-lbf}) \qquad (1)$$

where $I_m$ is the mass moment of inertia of the rim about its spin axis, e.g., $I_m=I+mr^2$, where m is the mass of the rim and r is the radius, and $\omega$ is the rotational (angular) velocity. As rotational velocity increases, the radial (centrifugal) force $F_r$ also increases, as given by equation (2).

$$F_r=m*\omega^2*r \qquad (2)$$

Thus, while dense material can store more energy it is also subject to higher radial force and thus fails at lower rotation speeds than low density material. Therefore, tensile strength tends to be the more important practical design criteria than density of material, which is the reason that known commercial flywheel rims are composed of low density, high strength carbon & glass fiber/epoxy laminates. With the flywheel designs discussed herein, flywheel filler mass design can be implemented to increase mass while maintaining flywheel and rim integrity. For example, if flywheel mass is doubled, $I_m$ is doubled, which according to equation (1) doubles the KE of the flywheel system.

The total kinetic energy stored ($E_k$) for a given mass ($m_c$), is given by equation (3).

$$E_k=0.5m_cr^2\omega^2 \qquad (3)$$

Equation (3) shows that stored energy increases four-fold for each doubling of rotational velocity $\omega$, due to the squared term. Accordingly, if a flywheel design can be implemented that permits reliable operation at higher rotational velocities, the energy storage, and energy density can be significantly increased.

Radial and hoop rim stresses, as defined by Roark, are a function of radius, $r^2$, and the radial body force ($\delta$). The radial body force is a function of radial centrifugal force divided by rim geometric volume. The radial force is a function of m, r and $\omega^2$ as indicated by the radial (centrifugal) force equation discussed earlier.

Still referring to FIG. 2, FIG. 3 and FIG. 4, using the above equations for calculations, in conjunction with FEA simulations, a number of parametric variations can be studied for optimization. Some such parameters include laminate thickness, laminate mass, lobe configurations including number and geometry of lobes, rim diameters, cost calculations with different configurations to reduce high cost items, e.g., amount of carbon/glass fiber material (T700), complexity and assembly costs, varying fiber angle with respect to radial direction, e.g., 0, 10, 20, 30, 45 degrees, hoop direction, 0, 10, 20, 30, 45 degrees and varying filler mass configuration. The flywheel designs discussed herein adopt criteria for one or more of the above parameters, which may be reviewed in combination, to achieve design goals.

The flywheel design illustrated in FIGS. 2, 3 and 4 align a majority of the composite fiber with the radial force to take advantage of the higher tensile strength of the fibers in reacting the force under load. Lobes 202 are thus able to withstand increased loading by meeting tensile and compressive forces in alignment with the carbon and/or glass fibers of the composite material. Filler material 204 radially displaces with increasing angular velocity to apply a compressive force on laminate 212 to counteract the radial force acting on the laminate 212 to minimize delamination. This increased capacity for loading, while maintaining a lightweight structure provided by the composite laminate construction, permits a number of design and/or operational options for increasing energy density and/or maximizing rim energy storage capacity. The lobe design permits separation of the rim material from the mass filler material, which obtains several advantages including greater angular velocity, ease of manufacturing and flexibility in design and implementation of the filler mass, to name a few.

Figure 12:
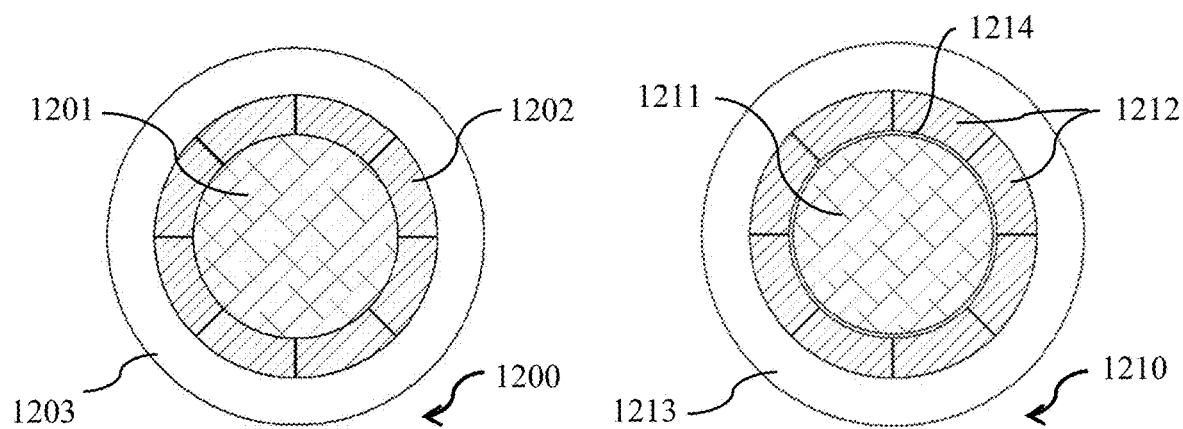
FIG. 12a is a cross sectional view of 8 radial displacing masses evenly distributed around the hub perimeter of a flywheel rim at rest, according to some embodiments of the present disclosure.
FIG. 12b is a cross sectional view of 8 radial displacing masses evenly distributed around the hub perimeter with the masses displaced at rim designed angular velocity, according to some embodiments of the present disclosure.
Figure 13:
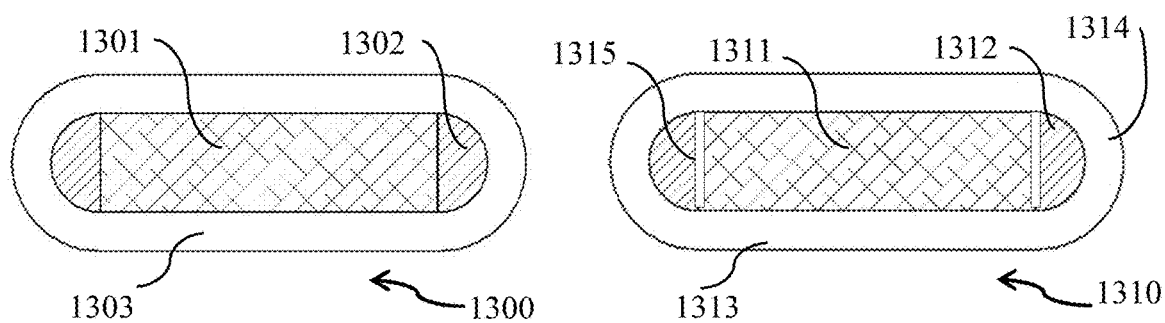
FIG. 13a is a cross sectional view of a rotating dipole with 2 radial displacing masses while at rest, according to some embodiments of the present disclosure.
FIG. 13b is a cross sectional view of a rotating dipole with 2 radial displacing masses with the masses displaced at designed angular velocity, according to some embodiments of the present disclosure.

In alternative embodiments, as shown in FIGS. 12*a* and 12*b* and FIGS. 13*a* and 13*b*, fibers are aligned in the hoop direction, such that the radial displacing masses oriented around the circumference of the hub or at dipole ends displace radially with increasing angular velocity and bear up against the hoop wound laminate to apply a compressive load to minimize laminate thru thickness radial stress to minimize the potential for delamination and therefore rim failure. FIG. 12*a* shows the rim 1200 at rest with the hub 1201 and 8 filler masses 1202, for this design, although any number of filler masses may be provided, in contact and restrained by the carbon/epoxy laminate 1203. FIG. 12*b* shows the rim 1210 at design speed with the hub 1211 not in contact with the 8 filler masses 1212, which are restrained by laminate 1213. FIG. 13*a* shows the dipole rim 1300 at rest with the hub 1301 and 2 filler masses 1302, for this design, although any number of filler masses may be provided, in contact and restrained by the carbon/epoxy laminate 1303. FIG. 13*b* shows the rim 1310 at design speed with the hub 1311 not in contact with the 2 filler masses 1312, which are restrained by laminate 1313.

Thus, use of the filler mass in separate lobes or oriented around hub circumference or at dipole ends permits design of compressive forces in the composite loop or hoop wound laminate. The separate masses each react to the applied radial force during operation at a designed angular velocity to apply a compressive force to the composite loop or hoop laminate. For example, at operational rotational velocity, radial stress on an outer end 214, as shown in FIG. 2, of a lobe 202 of FIG. 2 can urge the laminate layers of casings 212 of FIG. 2 apart near end 214 of FIG. 2, ultimately leading to delamination and degradation of the integrity of casings 212 causing rim failure. The filler material 204 of FIG. 2 or as shown in FIGS. 12*a*, 12*b*, 13*a* and 13*b*, as 1202, 1212, 1302, 1312, respectively, is specified and designed to apply a compressive force to outer ends 214 of lobes 202 of FIG. 2 or to 1203, 1213, 1303, 1313 to compress the laminate layers together, even as they experience tensile stress that is reacted well by the fibers in the composite material. The compressive force applied to outer ends 214 of lobes 202 of FIG. 2 and to 1203, 1213, 1303, 1313 counters the potentially delaminating radial stress on casings 212 and 1203, 1213, 1303, 1313 to contribute to maintaining the mechanical integrity of casings 212 of FIG. 2, and casings shown in FIGS. 12*a*, 12*b*, 13*a*, and 13*b*, as 1203, 1213, 1303, 1313, respectively.

The separate filler material mass can thus be designed to provide a separate compressive force to ends 214 of FIG. 2, and shown in FIGS. 12*a*, 12*b*, 13*a*, and 13*b*, as 1203, 1213, 1303, 1313, respectively, of each lobe 202 of FIG. 2 or laminate 1203, 1213, 1303, 1313 to counteract the through laminate thickness radial tensile force that otherwise cause delamination in prior commercial composite rims, which do not have such radially displacing filler material masses. Since each filler material mass is separate, they can be individually designed for compressive force based on material density, radial position and designed rotational velocity. The filler material mass applies a compressive force to counteract composite laminate thru thickness radial stress. In the absence of such a mass, the rim rotational velocity is limited to a maximum rotation of approximately 15,000 rpm, to avoid delamination of composite laminates with fibers oriented in a circumferential direction.

Thus, referring to FIG. 2, the same radial force that causes prior rim designs to fail is utilized to apply a force to act on a separate mass. In some example implementations, the mass is not separate. The radial force acting on the filler material mass in each lobe 202 applies a compressive force to casing 212 at outer ends 214 to counteract the same thru thickness rim radial force that is acting to separate the hoop laminate of casing 212 at outer ends 214.

Approximately 70% of the fibers in casing 212 in lobes 202 of FIG. 2 and in casing 1303, 1313 are oriented in the radial direction. This is compared to 100% of the fibers oriented in the hoop direction in casings 1203, 1213. According to other examples, the percentage of fibers aligned in the radial direction can be in the inclusive range of from about 25% to about 90%. Fibers oriented in the radial direction directly react the radial force such that, e.g., the relatively weaker composite resin bears less load. The remaining 30% of the fibers in casing 212 of FIG. 2, a majority of which are located at outer ends 214 of FIG. 2, transition to or are aligned in the circumferential direction, where the radial stress induced in part by the rotational velocity acts to separate the laminate layers. Alternately, FIGS. 12*a* and 12*b* orient load bearing composite fibers in the hoop direction, fibers in the hoop direction can vary from 0 to 45 degrees relative to the longitudinal axis of rotation. Fibers oriented in the hoop direction restrain radial displacing masses oriented around the circumference of the hub. The radial displacing masses apply a compressive load to the hoop wound laminate to minimize the thru thickness radial force acting on the laminate to minimize the potential of delamination.

The resin matrix (epoxy) in the composite material of casing 212 in FIG. 2, and 1213 and 1313, in FIGS. 12*b* and 13*b*, respectively, having a relatively weaker tensile strength than the fibers, experiences increased loading as the radial force on the portions of casing 212, 1213 and 1313 that have fibers oriented in the circumferential direction is reacted. The comparatively weak tensile strength resin matrix can fail sooner in these regions, e.g., outer ends 214 in FIG. 2, and 1314 in FIG. 13b, than does the relatively stronger tensile strength fibers. The thru thickness radial force is increased at greater radial distances, so that outer ends 214 and 1314 experience significant radial stress, even as the weaker composite material bears greater loads.

The separate mass or variable density filler, being acted upon by the same radial force counteracts the thru thickness force acting on the radial to circumferential directionally transitioning fibers in casing 212 of FIG. 2 and 1313 of FIG. 13b. The mass of filler material 204 in FIGS. 2 and 1311 in FIG. 13b, acts on the fibers in casing 212 in FIGS. 2 and 1313 in FIG. 13b, at outer ends 214 in FIGS. 2 and 1314 in FIG. 13b, by applying a compressive force that counteracts the radial force acting on the weaker resin matrix in composite casing 212 of FIGS. 2 and 1313 in FIG. 13b. This compressive force contributes to avoiding delamination of casing 212 of FIGS. 2 and 1313 in FIG. 13b at outer ends 214 of FIGS. 2 and 1314 in FIG. 13b.

Similarly, as shown in FIG. 12b, the separate mass or 8 variable density fillers, being acted upon by the same radial force counteracts the thru thickness force acting on the hoop oriented fibers in casing 1213. The mass of 8 filler materials 1212 acts on the fibers in casing 1213 by applying a compressive force that counteracts the radial force acting on the weaker resin matrix in composite casing 1213. This compressive force contributes to avoiding delamination of casing 1213.

As shown in FIGS. 2, 12b, and 13b, by specifying a design rotational velocity, the filler mass density can be specified and designed to apply the desired compressive force to prevent delamination at outer ends 214 of FIGS. 2 and 1314 in FIG. 13b, as well as hoop oriented fibers 1213 in FIG. 12b. The lobe design for flywheel 200 in FIG. 2, dipole design 1310 in FIG. 13b and circular design 1210 in FIG. 12b thus utilizes the tensile strength of the fibers in the composite material to permit significant increases in rotational velocity, while housing mass that contributes to preventing delamination near a flywheel rim. By permitting a significant increase in rotational velocity, significant increases in stored energy density can be achieved, which reduces kW/hr costs. In the case of utilities or other entities that utilize backup energy storage, the present design makes flywheels an affordable option without challenges presented by batteries.

As shown in FIG. 2, radial forces may also be used to reduce delamination occurrences at the inner ends of lobes 202. Since the inner ends are anchored to hub 208, the radial forces acting on the filler material 204 tends to urge the inner ends of lobes 202 radially outward. This radial outward force is reacted by the mechanism that fastens lobes 202 to hub 208, such as, for example, bolts 210. The reacted radial force applies a compressive force to inner ends of lobes 202 to contribute to preventing delamination in that area, where the relatively weaker resin matrix of the composite material of casings 212 bears greater loading than where the fibers are radially oriented.

In some example implementations of the flywheel system as shown in FIGS. 2, 12a, 12b, 13a, and 13b, the lobe design of flywheel 200, 1200 and 1300 is better able to retain filler material at a greater radial distance with a greater density than was possible with prior designs. The greater radial distance and density translates to greater energy density in the same amount of space. In some example implementations, the rotational velocity of the flywheel can be significantly increased, leading to a multiple of energy density and storage due to the squared rotational velocity term in the equation for the stored kinetic energy $E_k$.

The modular feature of the lobe design offers greater opportunity for maintenance and repair, where a malfunctioning/damaged lobe can be replaced onsite (onboard), while the prior flywheel design would not be replaceable or potentially repairable until the vessel reaches a port with the capacity to provide such services. The lobe, circular and dipole designs can provide higher density energy storage in a smaller space than prior designs, leading to reduced operational space, reduced cost, potentially greater numbers of flywheel systems in a given space, and other such physical advantages. The lobe, circular and dipole designs can take advantage of low cost extrusion and/or pultrusion fabrication processes, which can be implemented in parallel, to speed manufacture and reduce associated costs. The flywheel rim designs discussed herein may be used with current flywheel components, such as motor/generators, radial bearings, magnetic lift systems, so that cost can be reduced for implementation of the new designs.

As shown in FIGS. 2, 12a, 12b, 13a and 13b, filler and hub material 204, 208, 1202, 1201 and 1302, 1301 can be any type of material that fulfills design specifications, including, but not limited to materials such as elastic resins similar to polyurethane, cement, aluminum and steel. Cement offers greater mass, low strength at low cost, aluminum is useful as a filler material because of its relatively light weight for its rigidity so is high strain to failure resin(s) for its elasticity. Steel represents a greater mass, high strength material also with rigidity properties that are useful in flywheel applications. Composites offer matrix additives to tailor both the mass and stiffness for specific applications.

The number of loops or lobes may be varied. For example, reducing the number of lobes reduces the amount of expensive fiber in the composite material used to construct the lobes, leading to overall cost savings. A reduction in the number of components can also reduce manufacturing and maintenance costs.

Figure 5:
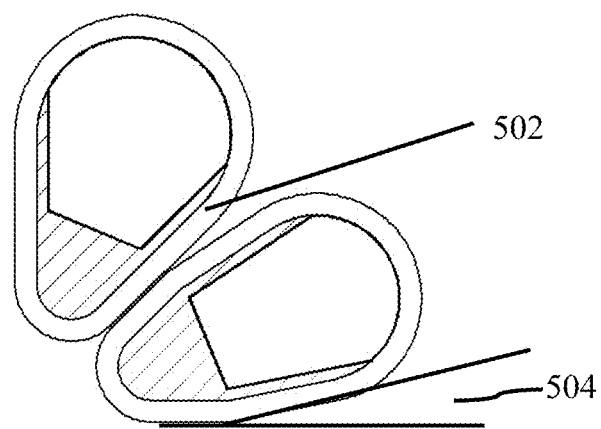
FIG. 5 is a partial cross-sectional side view of several lobes of a 10 loop flywheel design, according to some embodiments of the present disclosure.

The loop area subject to radial force may be modified or designed to meet specific criteria, including controlling magnetic bearing parasitic losses. For example, the loop area subject to radial force, as well as the volume of the filler mass, may be reduced by modifying loop cross section dimensions along the length of the radially aligned portions of the loop. FIG. 5 illustrates such a cross section dimension modification in an example using 10 loops to construct a rim. A loop beam 502 extends in the radial direction, and has an angular modification at an angle 504 in the outer radial region that serves to reduce loop cross sectional area, thereby controlling filler material volume and mass. These modifications can be applied to any of the loop/lobe designs discussed herein, for any number of loops/lobes.

According to some example implementations, the lobes (loops) attached to a hub may be spaced from each other, such that a gap is provided between each lobe. In such examples, the lobes may/may not be provided with lateral support, for example by the presence or absence of circumferentially aligned support members between the lobes. In some examples, the lobes may be provided with a freedom of movement in a circumferential direction, such as by, for example, being permitted to pivot with respect to the hub. In some examples, a filler material or structure may be provided between the lobes, which can contribute to maintaining the position of lobes with respect to each other. The variations or modifications to the lobes and their arrangements can be applied to any of the various examples discussed herein.

The filler mass composition and disposition can be utilized as a design parameter. For example, the filler material can be any type of useful material including metallic, fiber/matrix composite, polymer or plastic/thermoplastic or cement or combinations thereof, as non-limiting examples. The filler material may be constructed by molding, including injection molding, machining, stamping, 3-D printing and/or other operations that can reduce costs and/or improve quality.

Figure 6:
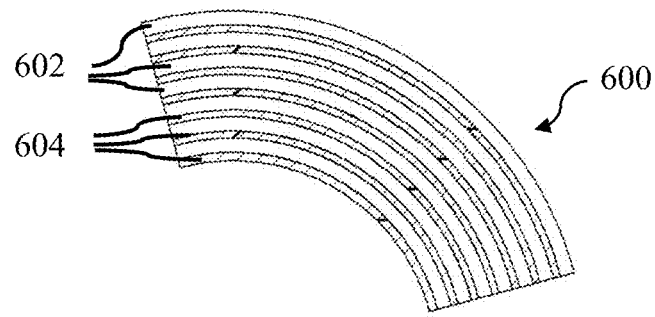
FIG. 6 is a partial cross-sectional side view of a flywheel rim with rim perimeter composite loops and mass layers, according to some embodiments of the present disclosure.

FIG. 6 is a partial cross-sectional side view of a flywheel rim 600, designed with circular sections radially stacked around the circumference of the rim. Segmented quarter circle or some arc angle aluminum rim inserts 604 are nested between carbon/epoxy rims 602. Inserts 604 are masses that apply a compressive force to rims 602, which tends to balance a radial stress experienced by rims 602. The design of rim 600 can control delamination stresses with the alternating layers of inserts 604 and rims 602. Aluminum inserts 604 can vary in radial thickness to optimize the compressive force applied to the adjacent outer radial composite rim.

Figure 7:
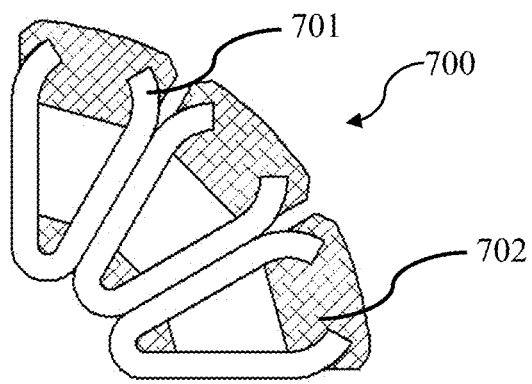
FIG. 7 is a partial cross-sectional side view of several lobes of a 12 loop flywheel design, according to some embodiments of the present disclosure.
Figure 8:
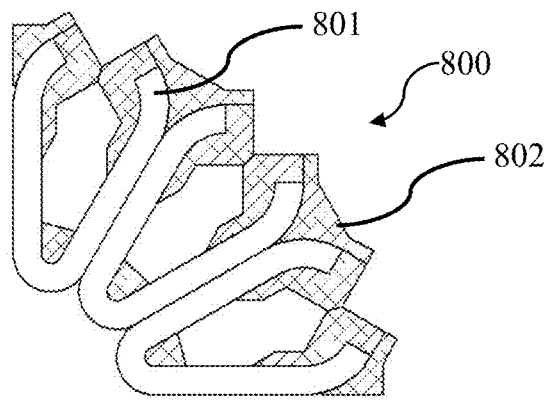
FIG. 8 is a partial cross-sectional side view of several lobes of a 12 loop flywheel design, according to some embodiments of the present disclosure.

FIG. 7 and FIG. 8 provide alternate lobe designs that align mass with radial aligned carbon fiber/epoxy laminates. Rims 700 and 800 have end caps 702, 802 may be comprised of, among other materials, aluminum, steel, polymer or hybrid that are secured, assemblies which, once assembled, geometrically secure, or lock the mass structure to the carbon/epoxy beams 701, 801. Rim 700 utilizes the volume between the radial beams to house filler material. Rim 800 aligns the mass of the aluminum end caps directly along the center line of the beams. The designs of rims 700 and 800 exploit the alignment of fiber tensile strength in the radial direction and locate end caps at a greater radial distance from the rotating axis. Radial stress is observed in the outer radial areas of the composite beams near the end curvature. This radial stress is a thru thickness tensile stress, which can be controlled with bolt tension applying a compressive force to the beam end curvature. Bolt torque would be dependent on designed rotational velocity. Hoop oriented fibers can be wound around the circumference of 700 to reduce end cap stress. The end caps apply a compressive load to the laminate to reduce thru thickness laminate radial stress.

Figure 9:
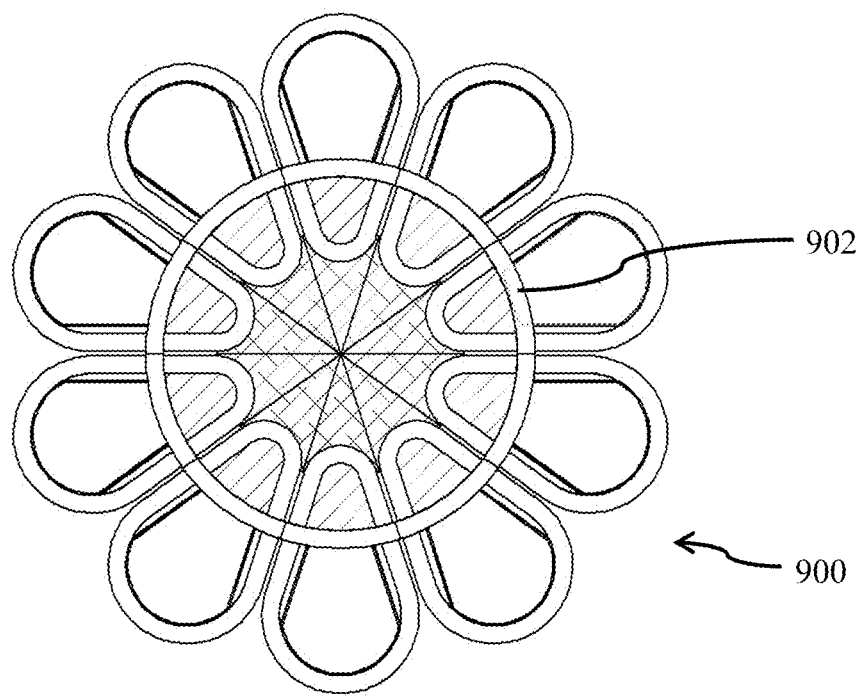
FIG. 9 is an end view of a 10 lobe rim design with a hub band, according to some embodiments of the present disclosure.

FIG. 9 is an end view of a 10 lobe flywheel rim 900 with a full length sprocket hub. The sprocket hub interacts with each loop inner axle extension component to react motor/generator torque stresses. Rim 900 includes a hub hoop band 902 that can contribute to relieving inner axle, fastener (hub to lobe) and lobe stress.

Figure 10:
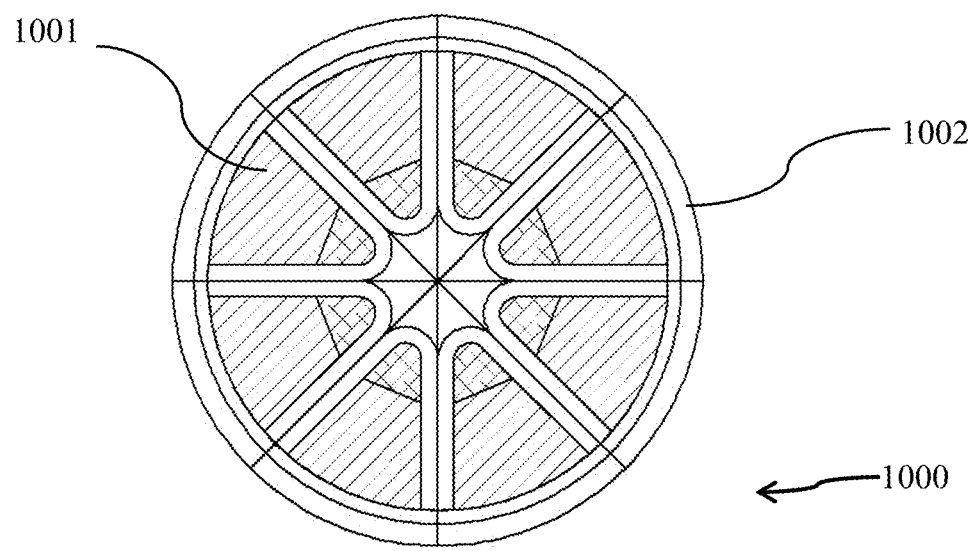
FIG. 10 is an end view of an 8 lobe flywheel design with a perimeter hoop wound composite laminate, according to some embodiments of the present disclosure.

FIG. 10 is an end view of an eight lobe flywheel rim 1000 with a filler material. Rim 1000 includes end hubs combined with a central sprocket hub. With the design of rim 1000, the radial deformation is excellent as it reduces metallic component flexure stress, hub reaction stresses and reduces laminate cyclic fatigue over the operational life of the rim. The design of rim 1000 uses a "semi-loop" geometry concept, where the rim is divided into 8 "loop-like" sections 1001, although any number of sections 1001 may be provided, that are bonded together and this sub-assembly then undergoes exterior hoop carbon fiber filament winding 1002. Filament winding binds the "loop-like" sections into a unified rim structure 1000. This construction results in comparatively low stresses on the central sprocket hub. This design extends the central sprocket hub full length and utilizes end hub integration to effectively react flexure. The design controls axial deflection well, which reduces component/assembly stress, a target for reducing the impact of cyclic fatigue. Although the component count of this design may be considered high, the components have simple 2D geometric cross sections permitting low-cost fabrication by extrusion or pultrusion. The concepts shown for rim 1000 are readily transferable to other rim implementations to reduce rim component stresses. Rim 1000 may be implemented with an axially oriented carbon fiber-epoxy composite inner axle component.

Figure 11:
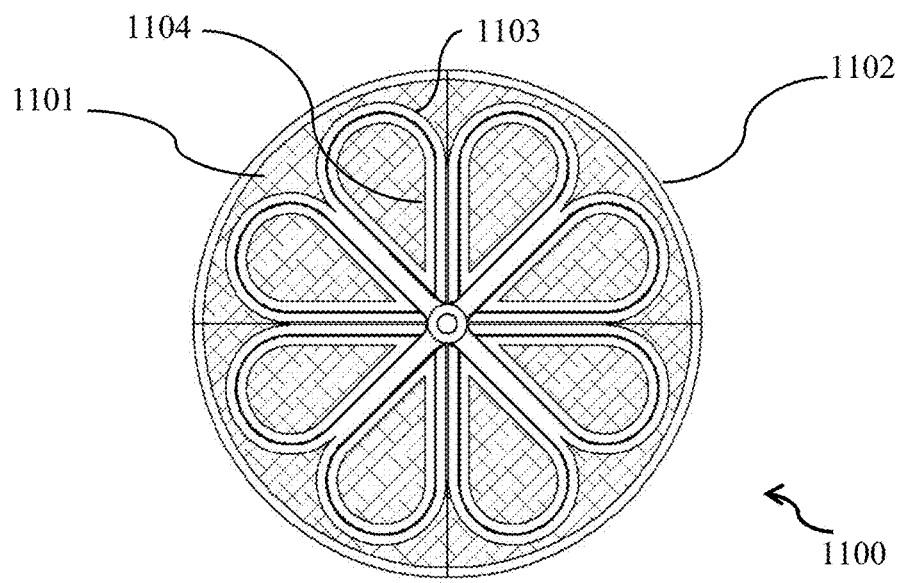
FIG. 11 is an end view of an 8 lobe flywheel design with four quarter sections and hub end bands, according to some embodiments of the present disclosure.

FIG. 11 is an end view of an eight lobe flywheel rim 1100 that utilizes the loop geometry to integrate the loop into a central hub-like structure eliminating a central hub. Rim 1100 can orient from approximately 4 to 90 degree or variations as shown by 1101, or from approximately 8 to approximately 45 degree or variations, to secure loop structures around a central rotating axis. Securing the 4-90 degree structures is a hoop wound laminate 1102. The design of rim 1100 permits the loop to deform somewhat independently along loop axial length. This design builds elasticity into the carbon-epoxy material system.

This design, as shown in FIG. 11, permits the offsetting of filler rim mass to either side of the radially aligned carbon-epoxy fibers 1103. In other examples discussed herein, the load bearing hoop wound carbon fiber 1104 is directed around the filler mass, resulting in transfer of the metallic load to the carbon fiber. In the design of rim 1100, increases in the radial load are directly reacted by the radially aligned carbon fiber 1103 and 4-90 degree structures 1101, 1102. The filler masses are positioned to either side of this load bearing radially aligned fiber 1103 which is out of the load path, thus reducing metallic component stress. This design offers a moderate component count and simplified geometric load path, which is important from a stress perspective. Hoop oriented fibers can be wound around the circumference to increase the axial bending rigidity of rim 1102.

The flywheel rim design 1200, 1210, as shown in FIGS. 12a and 12b, respectively, illustrate how the radial mass(es) are displaced. The fiber orientation of the rim shown in FIGS. 12a and 12b may be oriented in the radial (loop design) and/or hoop direction, as illustrated in the hoop direction. FIG. 12a illustrates a flywheel rim at rest. The components of the rim are the outer carbon/epoxy laminate 1203, and for this example eight radially displacing mass(es) 1202 located around the rotating axis central hub 1201. Referring to FIG. 12b, as the flywheel rim rotational velocity increases, the mass(es) continue to radially displace until the flywheel rim reaches its design angular speed. At design speed, the radial mass(es) are at their maximum radial displacement 1212. Each filler mass theoretically radially displaces the same distance 1214. This is illustrated in FIG. 12b by a gap, or space 1214, disposed between the rotating hub and rotating mass(es). The radial displacing mass(es) may remain in contact with the hub, elastic filler material, or may not remain in contact with the hub, inelastic filler material, as illustrated. In the latter case, hub and filler mass geometry are designed to permit contact in the hoop direction for the transfer of rim rotational torque loads between the hub and filler mass(es). Similarly, as shown in FIG. 13b, the dipole design 1310 radial displacing masses 1312 at design speed may or may not exhibit a gap or space 1315.

The radial displacing mass(es) can be any number around the hub perimeter, any size and/or geometric shape. As shown in FIG. 2, the radial displacing mass(es) has an inner portion 215 and an outer portion 216. Inner portion 215 is disposed opposite to the outer portion 216. Inner portion 215 is adjacent to the hub perimeter and the outer portion 216 is adjacent to fiber resin composite. Radially positioning the outer portion 216 further from the rotating axis significantly increases the rims mass moment of inertia thereby significantly increasing total kinetic energy stored. The mass could be a single component or multiple components located around the hub. A single mass can consist of a single component or an assembly of components. The mass(es) can utilize an infinite range of materials from fibrous/matrix materials, metals, hybrid metallic/fibrous materials, pressed powders, high strain to failure resin(s), cement any material that permits the radial force to act on the mass to apply a compressive force to the laminate that minimizes delamination.

The joint between the radial displacing mass(es) and the hub also has an infinite number of geometric possibilities. This joint reacts flywheel rim torque during acceleration/deceleration, as well as to permit each mass to radial displace to apply a compressive load/mass on the hoop wound carbon fiber/matrix laminate and maintain a balanced rim.

The hub interacts with the motor/generator and the radial displacing mass(es). As with the radial displacing mass(es), the hub has an infinite number of geometric possibilities and material options. Hub geometry and material selection needs to react motor/generator torque, permit a mass/each mass to radially displace and maintain a balanced rim.

As illustrated in FIGS. 12a and 12b, and FIGS. 13a and 13b, as the flywheel rim increases in rotational velocity the radial mass(es) may or may not remain in contact with the hub, contact is determined by the filler mass material elasticity. With respect to loop type rims, the radial masses may remain in contact with the rim. For hoop wound laminates, as shown in FIGS. 12a and 12b, and FIGS. 13a and 13b, radial displacing masses are in contact with the hub at rest. However, with increasing rotational velocity the radial force acts on each mass radially displacing the mass, so that at design speed each mass may no longer contact the hub in the radial direction, but remains in contact with the hub in the hoop direction. At flywheel rim design speed the hub may rotate without radial contact with the mass(es).

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known processes, structures, and techniques have been shown without unnecessary detail to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional stages or functions not included in the figure.

Having described several example configurations, various modifications, alternative constructions, and equivalents may be used without departing from the spirit of the disclosure. For example, the above elements may be components of a larger system, wherein other structures or processes may take precedence over or otherwise modify the application of the invention. Also, a number of operations may be undertaken before, during, or after the above elements are considered. Accordingly, the above description does not bound the scope of the claims.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

What is claimed is:

1. A flywheel for a flywheel energy storage system, comprising:
    a hub configured to rotate about a longitudinal axis;
    at least one member having a laminate casing connected to the hub, the laminate casing is formed with an enclosed space for housing at least one mass with a fixed shape, the enclosed space is structured and designed to control radial displacement of the at least one mass, so the at least one mass radially displaces and is positioned to apply a controllable compressive load on the laminate casing,
    wherein upon rotation, an operational radial force applies a through thickness laminate radial load to the laminate casing, while simultaneously radially displacing the at least one mass to apply the controllable compressive load on the laminate casing, the applied controllable compressive load increases a predetermined laminate loading capacity by an amount of compressive load counteracting the through thickness laminate radial load, resulting in a corresponding increase in a flywheel angular velocity, that therefore increases an amount of energy stored by the flywheel energy storage system.

2. The flywheel of claim 1, wherein the at least one mass is symmetrically arranged around the hub, and configured with a density greater than a density of the laminate casing, and
    wherein the at least one mass applies the controllable compressive load on an inner radius of the laminate casing, such that the controllable compressive load is determined based on: (a) an amount of material density of the at least one mass in relation to an amount of density of the laminate casing; (b) an amount of a material strength of the laminate casing, (c) a radial position of the at least one mass in relation to the longitudinal axis of the hub when under the applied operational radial force, (d) the flywheel angular velocity; and (e) an amount of material mass of the at least one mass that is greater than an amount of mass of the laminate casing, which allows for the through thickness laminate radial load to be controlled.

3. The flywheel of claim 1, wherein the at least one member is arranged as one or more loops composed of a fiber-resin composite material.

4. The flywheel of claim 3, wherein the hub includes a first end and a second end opposite to the first end, and wherein at least one loop of the one or more loops is disposed on the first end and at least one other loop of the one or more loops is disposed on the second end of the hub.

5. The flywheel of claim 3, wherein at least some of the fibers in the fiber-resin composite material are arranged according to one or more of, (a) at least 5% aligned in a radial direction, (b) at least 5% aligned in a hoop direction, (c) in contact with the at least one mass, or (d) wherein the fiber-resin composite material is radial or hoop wound.

6. The flywheel of claim 1, wherein the parameter range is one or more of, (a) 15,000 rpm to 50,000 rpm for a rotational velocity, (b) 15.24 cm to 203.00 cm for a rim diameter, or 0.50 MJ to 3000.00 MJ for a kinetic energy.

7. A method for constructing a flywheel for a flywheel energy storage system, comprising:
coupling at least one member having a laminate casing to a hub to rotate about a longitudinal axis of the hub;
forming the laminate casing with an enclosed space to house at least one mass with a fixed shape, the enclosed space is structured and designed to control radial displacement of the at least one mass, so the at least one mass radially displaces and is positioned to apply a controllable compressive load on the laminate casing;
disposing the at least one mass in the enclosed space, and configuring the at least one mass with a density greater than a density of the laminate casing; and
configuring the at least one mass to radially displace upon rotation of the hub, as an operational radial force applies a through thickness laminate radial load to the laminate casing, the at least one mass applies the controllable compressive load on an inner radius of the laminate casing, the applied controllable compressive load increases a predetermined laminate loading capacity by an amount of compressive load counteracting the through thickness laminate radial load, resulting in a corresponding increase in a flywheel angular velocity, that therefore increases an amount of energy stored by the flywheel energy storage system.

8. The method of claim 7, further comprising arranging the at least one mass symmetrically around the hub.

9. The method of claim 7, further comprising arranging the at least one member as one or more loops composed of a fiber-resin composite material.

10. The method of claim 9, further comprising at least some of the fibers in the fiber-resin composite material to be arranged according to one or more of, (a) at least 5% aligned in a radial direction, (b) at least 5% aligned in a hoop direction, (c) in contact with the at least one mass, or (d) wherein the fiber-resin composite material is radial or hoop wound.

11. The method of claim 7, further comprising configuring the flywheel to have a parameter range.

12. The flywheel of claim 11, wherein the parameter range is one or more of, (a) 15,000 rpm to 50,000 rpm for a rotational velocity, (b) 15.24 cm to 203.00 cm for a rim diameter, or 0.50 MJ to 3000.00 MJ for a kinetic energy.

13. A flywheel, comprising:
a hub configured to rotate about a longitudinal axis;
at least one member having a laminate casing connected to the hub, the laminate casing is formed with an enclosed space for housing at least one mass with a fixed shape, the enclosed space is structured to control radial displacement of the at least one mass, so the at least one mass radially displaces and is positioned to apply a controllable compressive load on the laminate casing,
wherein upon rotation, an operational radial force applies a through thickness laminate radial load to the laminate casing, while simultaneously radially displacing the at least one mass to apply the controllable compressive load on the laminate casing, the applied controllable compressive load increases a predetermined laminate loading capacity by an amount of compressive load counteracting the through thickness laminate radial load, resulting in a corresponding increase in a flywheel angular velocity, that therefore increases an amount of energy stored by the flywheel energy storage system.

14. The flywheel of claim 13, wherein the at least one mass applies the controllable compressive load on an inner radius of the laminate casing, such that the controllable compressive load is determined based on: (a) an amount of material density of the at least one mass in relation to an amount of density of the laminate casing; (b) an amount of a material strength of the laminate casing, (c) a radial position of the at least one mass in relation to the longitudinal axis of the hub when under the applied operational radial force, (d) the flywheel angular velocity; and (e) an amount of material mass of the at least one mass that is greater than an amount of mass of the laminate casing, which allows for the through thickness laminate radial load to be controlled.

15. The flywheel of claim 13, wherein the at least one mass includes an inner portion positioned adjacent to a hub perimeter of the hub, and an outer portion positioned toward an inner radius of the laminate casing, the inner portion is disposed opposite to the outer portion, such that a radially positioning of the outer portion is further from the longitudinal axis, increases a mass moment of inertia of an outer end of the laminate casing, which thereby increasing a total kinetic energy stored when compared to a predetermined total kinetic energy stored of the flywheel.

16. The flywheel of claim 13, wherein the at least one member is arranged as one or more loops composed of a plurality of fiber-resin composite fibers wound in a hoop direction and enclose both the at least one mass and the hub.

17. The flywheel of claim 13, wherein the at least one mass includes (a) an elastic material that remains in contact with the hub, while the elastic material elongates during rotation via the applied operational radial force to apply the compressive load on an inner radius of the laminate casing, or (b) an inelastic material that radially displaces away from the hub during rotation via the applied operational radial force to apply the compressive load directly on the inner radius of the laminate casing.

18. The flywheel of claim 13, wherein the at least one mass includes multiple masses, and each mass of the multiple masses is individually designed for the controllable compressive force based on a material density of each mass of the multiple masses, a radial position of each mass to a center of the hub, and the flywheel angular velocity, such that the compressive force applied by each mass counteracts an amount of the through thickness radial stress on the laminate casing.

19. The flywheel of claim 13, wherein the flywheel is for a flywheel energy storage system, and designed to improve a level of performance of the flywheel energy storage system based on the density of the at least one mass being greater than the density of the laminate casing, a radial position of the at least one mass in relation to the longitudinal axis when under the applied operational radial force, and the flywheel angular velocity, as expressed in equation: $F_r = m * \omega^2 * r$, where $F_r$ is a radial (centrifugal) force,
m is a mass of the laminate casing,
r is a radius of the at least one member, and
$\omega$ is the flywheel angular velocity.

* * * * *